(12) United States Patent
Northrup

(10) Patent No.: US 10,596,482 B1
(45) Date of Patent: Mar. 24, 2020

(54) SELF-REGULATING VACUUM STILL

(71) Applicant: Northrup, Inc., Austin, TX (US)

(72) Inventor: Robert P. Northrup, Austin, TX (US)

(73) Assignee: NORTHRUP, INC., Austin, TX (US)

( * ) Notice: Subject to any disclaimer, the term of this patent is extended or adjusted under 35 U.S.C. 154(b) by 170 days.

(21) Appl. No.: 15/699,988

(22) Filed: Sep. 8, 2017

(51) Int. Cl.
| | | |
|---|---|---|
| *B01D 3/10* | (2006.01) | |
| *B01D 3/02* | (2006.01) | |
| *B01D 5/00* | (2006.01) | |
| *B01D 1/00* | (2006.01) | |
| *C02F 1/04* | (2006.01) | |
| *C02F 1/14* | (2006.01) | |
| *C02F 103/08* | (2006.01) | |

(52) U.S. Cl.
CPC ............ *B01D 3/10* (2013.01); *B01D 1/0035* (2013.01); *B01D 3/02* (2013.01); *B01D 5/006* (2013.01); *C02F 1/046* (2013.01); *C02F 1/14* (2013.01); *C02F 2103/08* (2013.01)

(58) Field of Classification Search
CPC .................................. C02F 1/04; B01D 3/10
USPC .......... 203/10, 11, DIG. 4, DIG. 8, DIG. 17; 202/154, 176, 181, 183; 159/47.1
See application file for complete search history.

(56) References Cited

U.S. PATENT DOCUMENTS

| | | | |
|---|---|---|---|
| 1,544,029 A | 6/1925 | Nelson | |
| 2,490,659 A | 12/1949 | Snyder | |
| 3,096,257 A | 7/1963 | Foutz | |
| 3,232,846 A | 2/1966 | Kimmerle | |
| 3,558,436 A | 1/1971 | Foley et al. | |
| 127,197 A | 5/1972 | Simpson | |

(Continued)

FOREIGN PATENT DOCUMENTS

| | | |
|---|---|---|
| DE | 2829903 A1 | 1/1980 |
| EP | 0265300 A1 | 4/1988 |
| WO | 2007006323 A1 | 1/2007 |

OTHER PUBLICATIONS

Abstract for EP0265300(A1), ESPACENET, English Abstract, Apr. 1988.

(Continued)

*Primary Examiner* — Nina Bhat
(74) *Attorney, Agent, or Firm* — Mark W Handley; Handley Law Firm, PLLC

(57) ABSTRACT

A self-regulating vacuum still (8) has a fluid reservoir (10), a boiler (28), a vapor separator (46), a condenser (33), and a condensate reservoir (58). The boiler (28) receives fluid from the fluid reservoir (10) in liquid form and heats the fluid to generate fluid vapor, preferably using evacuated solar tubes (44). The vapor separator (46) receives the fluid vapor from the boiler (28) and separates entrained moisture. Preferably a packing (50) is provided by structured wire mesh which is disposed in a vapor outlet (49) from the vapor separator (46). The condenser (33) receives the fluid vapor from the vapor separator (46), and cools the fluid vapor to a condensate. The condenser (3) has a collection section (34), a condensate section (35) and an outlet (16) which is proximate to the collection section (34) and the condensate section (35). An airlock (20) is connected to the outlet (16) for venting air and fluid vapor from the condenser (33) when a preselected pressure is exceeded. A condensate reservoir (58) is connected to the condenser (33) for receiving condensate.

20 Claims, 3 Drawing Sheets

(56) References Cited

U.S. PATENT DOCUMENTS

| | | | |
|---|---|---|---|
| 4,639,293 A | 1/1987 | Lew | |
| 4,686,009 A * | 8/1987 | McCabe | B01D 3/04 |
| | | | 159/DIG. 16 |
| 4,762,593 A * | 8/1988 | Youngner | B01D 3/103 |
| | | | 159/DIG. 16 |
| 5,064,505 A | 11/1991 | Borgren | |
| 5,538,598 A * | 7/1996 | Schlesinger | B01D 1/0017 |
| | | | 202/197 |
| 6,254,734 B1 * | 7/2001 | Sephton | B01D 1/065 |
| | | | 159/2.3 |
| 7,431,806 B2 | 10/2008 | Levine | |
| 8,080,138 B2 * | 12/2011 | Nirmalakhandan | B01D 1/0035 |
| | | | 203/11 |
| 2007/0131534 A1 * | 6/2007 | Capan | B01D 3/103 |
| | | | 203/39 |
| 2008/0289947 A1 * | 11/2008 | Thumm | A23L 2/02 |
| | | | 202/160 |
| 2010/0065414 A1 * | 3/2010 | Rautenbach | B01D 1/0017 |
| | | | 202/167 |

OTHER PUBLICATIONS

Abstract for DE2829903(A1), ESPACENET, English Abstract—Jan. 1980.

\* cited by examiner

SELF-REGULATING VACUUM STILL

TECHNICAL FIELD OF THE INVENTION

The present disclosure relates in general to vacuum stills, and in particular to vacuum stills which use the weight of a fluid column to create a vacuum and which, at least in part, drives distillation.

BACKGROUND OF THE INVENTION

Clean water is necessary for human health and well being. Evaporating and condensing of water, in natural processes such as the water cycle and in the man-made processes of distillation and desalination, cleans water of most or all impurities. However, the high specific heat of water and other liquids of moderate volatility means an expensive expenditure of energy is required, for distillation and desalination.

Many inventions have used a vacuum to reduce vapor pressure and achieve evaporation with less energy for heating. These include use of a barometric column of condensate, a technique derived from barometers and the ancient observation that water cannot be siphoned at a height exceeding 10.3 meters—"nature abhors a vacuum," as Aristotle theorized. In these inventions, the barometric column of condensate has been used to pull an initial vacuum, and/or as a pulling counter-weight to slow the loss of vacuum in an evaporative stage, and in other novel manners.

Many inventions have used solar energy and ambient temperature differences, alone or in combination with vacuums, to increase the heat-energy efficiency of evaporation. Related inventions have used various mechanical devices, series of chambers, stop-cocks and valves, gauges and timing sequences to achieve greater efficiency of evaporation and condensation. Some have used vents, for filling the system initially, and for periodic evacuation of air entrained in water, usually using mechanical vacuum pumps. The Newcomen engine used a "snifting clack," a valve so-named because it sounded like a congested man breathing out his nose, to relieve air entrained in water that built up in his vacuum-driven piston cylinder. Some of the inventions require a high degree of oversight and control in their operation, and most need periodic system purges and maintenance of various pumps and active devices.

There may be a need and a market for a simple system that is self-starting and self-stopping. Preferably, such a system would not require either energy-consuming devices for its operation or need for regular oversight to function. The system would also use the force of gravity working on a column of condensed water to create vacuums and reduce heat energy expenditure. Preferably, the thermal "delta" or difference would create an evaporation region and a condensation region which could be established passively, with low-cost or free energy. A system is needed that incorporates all the aforementioned features and yet still scales well, to be affordable to private citizens as well as public utilities or private corporations. A system, finally, designed to use natural changes in outdoor temperature to its advantage, would be robust, forgiving, and desirable.

SUMMARY OF THE INVENTION

A novel self-regulating vacuum still is disclosed having a fluid reservoir, a boiler, a vapor separator, a condenser, and a condensate reservoir. The boiler has a fluid section which includes a liquid portion and a vapor portion. The liquid portion is in fluid communication with the fluid reservoir for receiving the fluid from the fluid reservoir with the fluid disposed in liquid form in the liquid portion of the fluid section. A one-way flow control valve preferably disposed there-between the fluid reservoir and the fluid section of the boiler. The fluid is heated in the boiler to generate fluid vapor, preferably using heat provided by evacuated solar tubes which is conducted to the fluid section. The vapor separator receives fluid vapor from the boiler along with moisture entrained with the fluid vapor, and separates the entrained moisture from the fluid vapor. The vapor separator has an inlet with an end segment having perforations for passing the fluid vapor, with the perforations preventing foaming of the fluid vapor. The vapor separator further includes an enclosure which has a cross-sectional area which is larger than a cross-sectional area of the vapor portion of the fluid section of the boiler. A vapor outlet is located between the vapor separator and the condenser, and structured wire mesh is disposed in the vapor outlet for capturing the moisture entrained in the fluid vapor.

The condenser has a vapor collection section and a condensate section which sequentially receive the fluid vapor from the boiler and the vapor separator, and then cool the fluid vapor to a condensate and receive the condensate in the condensate section. A condensate level is defined between the fluid vapor and the condensate, and the condensate level is located beneath the vapor collection section. An outlet is disposed in the condenser, proximate to the collection section and the condensate section. An airlock is connected to the outlet for selectively venting fluid vapor from the condenser when a preselected pressure is exceeded within the condenser. A condensate reservoir is disposed in fluid communication with the condensate section of the condenser for receiving condensate. The condensate reservoir has a dispensing valve for selectively passing the condensate therefrom.

DESCRIPTION OF THE DRAWINGS

For a more complete understanding of the present disclosure and the advantages thereof, reference is now made to the following description taken in conjunction with the accompanying Drawings in which

FIG. 1 is a schematic graph of the system's cycles;

FIG. 2 is a schematic of an exemplary self-regulating vacuum still depicted during the filling phase of the system's cycle;

FIG. 3 is a schematic of the self-regulating vacuum still of FIG. 2 depicted during the full phase of the system's cycle; and FIG. 4 is a schematic of second self-regulating vacuum still constructed in accordance with the present disclosure.

DETAILED DESCRIPTION OF THE INVENTION

Figure 1:
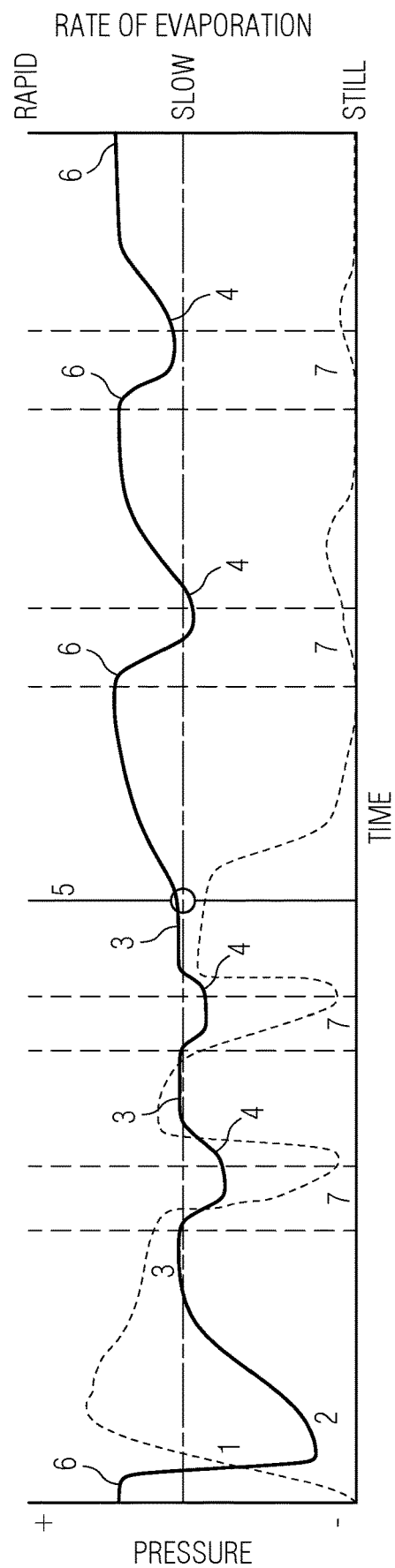
FIGS. 1 through 4 show various aspects for self-regulating vacuum stills made according to the present disclosure, as set forth below.

Referring to the Figures, FIG. 1 graphs an exemplary cycling of the system, its two phases, stages, and several periodic iterations that complete and comprise one cycle. System pressure, represented qualitatively but not quantitatively by the Y-axis, is graphed along a solid line against time on the X-axis. Above the line is positive pressure and below the line is a vacuum. The rate of evaporation, represented qualitatively but not quantitatively by the secondary right-hand Y-axis, is graphed along a soft dotted line, also against time on the X-axis. The graphs are here provided to explain stages typical in operation.

The system starts where it had ended in the previous cycle, in a full and pressure-positive stage 6, where evaporation is still and thus the system is at equilibrium. The default assumption is a constant amount of heat, such as from sunlight, entering the system. To begin the cycle, here we dispense along region 1 the full column of condensed water, forming a vacuum. With heat entering the system, and a vacuum now formed, evaporation generates vapor which begins to fill the vacuum along curve 2 until near-atmospheric pressure is reached at region 3. Evaporation continues steadily as excess pressure is vented along region 3, as will be described below, until heat is removed in section 7. This stage of cooling shown by section 7 could be caused, as examples, by diurnal temperature variation, by cloud cover, by rain, or by a removal of the heat source. Here it is shown as a consistent cooling duration and amount. It induces a drop in pressure in region 4, as gas expanded by heat now contracts. As the cooling period of section 7 ends, this trough in pressure in region 4 ends, and evaporation resumes while venting along section 3.

Once the system fills up with condensate, the cycle enters the next phase, demarcated at point 5. Here pressure rises beyond near-atmospheric for the first time, rising until it reaches a maximum at point 6. This is the full phase of the cycle, wherein evaporation has mostly subsided. A very modest amount of evaporation may continue after drops in pressure along region 4 due to cooling in section 7; once heat resumes, however, this evaporation eventually stops once the system is completely full of condensate.

Figure 2:
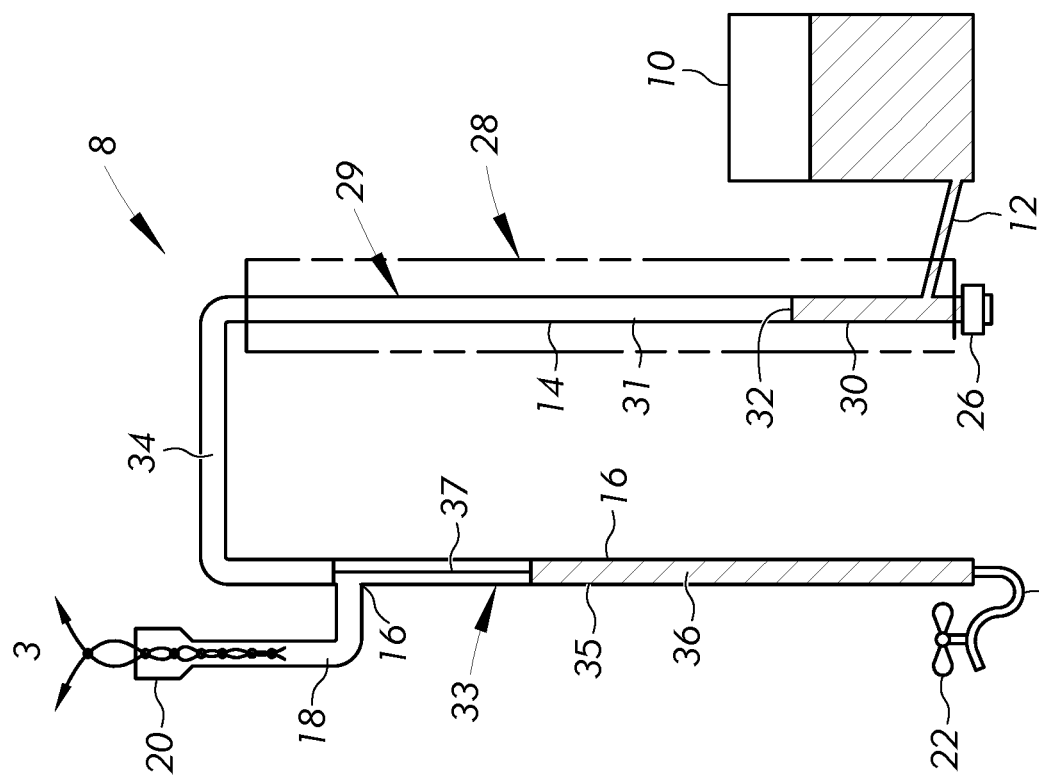

Now referring to FIG. 2, a schematic diagram of a self-regulating vacuum still 8 shows the parts of a basic embodiment. Water level 32 and condensate level 37 are shown as they would correspond to specific numbered stages of the cycle in FIG. 1. A reservoir 10 for the water supply is preferably open to atmospheric pressure. The vacuum still 8 has boiler 28 and a condenser 33. Water is contained in the boiler 28 within a fluid section 29, which has a liquid portion 30 and a vapor portion 31. The interface between the liquid portion 30 and the vapor portion 31 defines a liquid level 32. The lower end of the fluid section 29 is preferably sealed with a cap 26, which may be provided by a plug, cap, or valve, provided it is air-tight. The condenser 33 has a collection section 34 and a condensate section 35. Water vapor from the boiler 28 enters the condenser 33 and is collected in the collection section 24. A vapor leg 14 is defined to extend from the vapor portion of the fluid section 29 of the boiler 28, through the collection section 24 of the condenser 33 and into the condensate section 35, terminating above the condensate column 36. The interface of the vapor leg 14 and the condensate column 36 define the condensate level 37.

The condenser 33 further has an outlet 16 which is located in an upper portion of the condensate section 35, proximate to the collection section 34. A tube 18 has an interior terminal end which extends from the outlet 16 to define a chamber for collecting air entrained in the water from reservoir 10 and water vapor. An airlock 20 is mounted on the exterior terminal end of the tube 18 to provide a one-way valve for venting the collected air and water vapor when excess pressure is encountered within the vacuum still 8. In some embodiments, the airlock 20 may be replaced by a check valve which is configured to vent air and water vapor when the preselected pressure is exceeded. A dispensing valve 22 allows the condensate column 36 to be drained, or dispensed, via the U-shaped pipe type gas trap 24.

Water is available through a gently rising water inlet 12 to the vertical section comprising the vapor leg 14 of the system. The boiler 28 is preferably a region where heat is applied to the fluid section 29. Heat is preferably provided by sunlight striking the exterior of a tube or other structure providing the fluid section of the boiler 28, in order to achieve evaporation. The water evaporates from the surface of liquid level 32 and fills the vapor leg 16, including both the vapor portion 31 of the fluid section 29 and the collection section 34 of the condenser 33. The water vapor in the collection section 34 of the condenser 33 is then cooled and condensed to a liquid condensate, and the condensate is received in the condensate section 35 and collected in the condensate column 36. The liquid condensate then fills the condensate column 30, raising the condensate level 36, depicted as a height range. The condensate column 36 is the stacked volume of condensate.

Now the cycle will be explained in detail, referring to FIG. 2 and as it corresponds to FIG. 1. During the filling phase, to the left of demarcation at point 5 in FIG. 1, the liquid level 32 is free to rise or fall modestly as pressure in vapor leg 14 varies. Opening the dispensing valve 22 will drop the condensate column 36 until it reaches the bottom marking of the height range for condensate level 37, as it balances a vacuum created in the vapor leg 14 inside the system with atmospheric pressure outside. This vacuum-forming event is marked by region 1 on the graph in FIG. 1.

As heat is applied around region 28, liquid evaporates, fills the system with its gas pressure, and condenses, filling the condensate column 36 and raising the condensate level 37. First the vacuum is filled by evaporate, as marked along curve 2 on the graph of FIG. 1, then evaporate gas in excess of the back pressure of a liquid-filled airlock 20 will vent out, as marked at part 3 in FIG. 1 and also depicted in FIG. 2. In other embodiments where a one-way check valve is used in place of an airlock 20, evaporate gas will vent when the cracking pressure of the one-way check valve is exceeded. With heat removed in region 7 of the graph of FIG. 1, evaporation stops and pressure drops to point 4, as depicted by the drop in the graphed rate of evaporation, and much condensate forms, in both the boiler 28 and the condenser 33. The system remains as depicted in FIG. 2 during these stages, until the condensate level 37 fills to its top marking.

Figure 3:
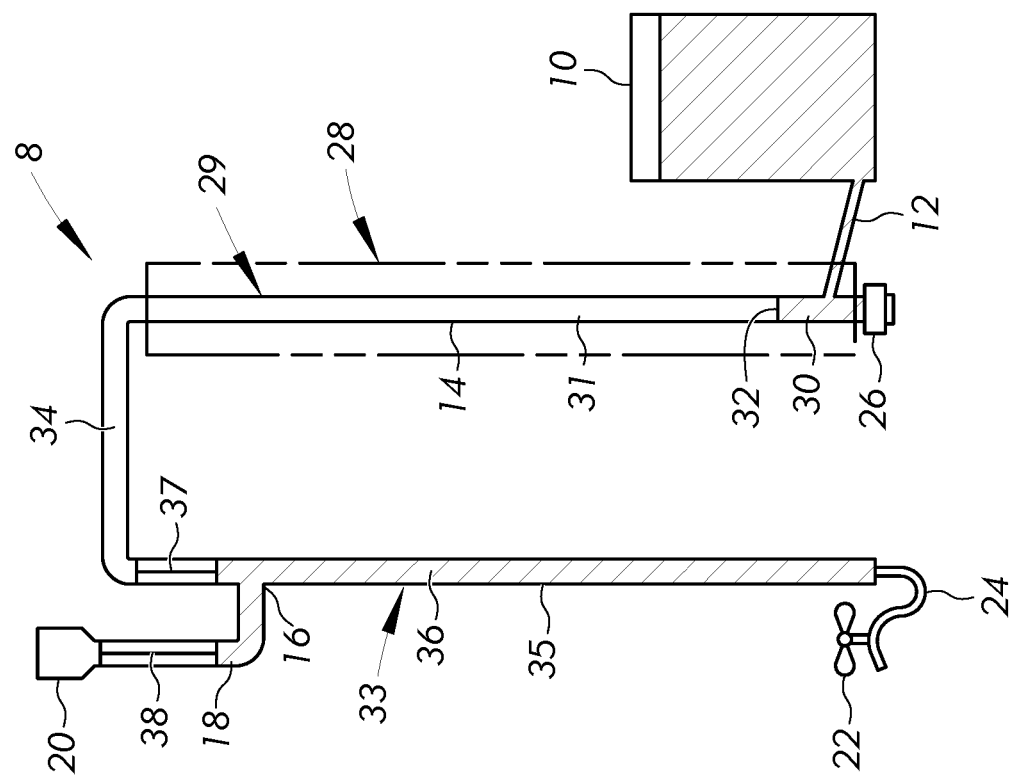

Now referring to FIG. 3, the condensate column 30 has risen to close the outlet 16. The collection section 34 is now sealed off from the outlet 16 and the airlock 20. Referring to FIG. 1, the system is now in the full phase of the cycle, graphed to the right of demarcation 5. Pressure can now build above atmospheric, as marked at the maximum pressure point 6 on the graph. During cooling in region 7, pressure can still drop in troughs 4, with a very slow rate of evaporation occurring. Now referring to FIG. 3, the pressure build above atmospheric raises the vapor pressure in the vapor leg 14, shutting off evaporation as heat input and heat loss remain steady. This pressure build up can also push the height of condensate in the outlet level 37 up to its top marking. If pressure in the vapor leg 14 pushes the top outlet level 38 high enough, condensate will flow freely out of the airlock 20, thus acting as an emergency pressure relief valve for the vapor leg 14. Due to the increased air pressure, liquid level 32 may sit lower in the fluid section 29. With the condensate section 35 full of the condensate, the condensate column 36 is ready to be dispensed again, back to the region 1 of the curve in FIG. 1.

Figure 4:
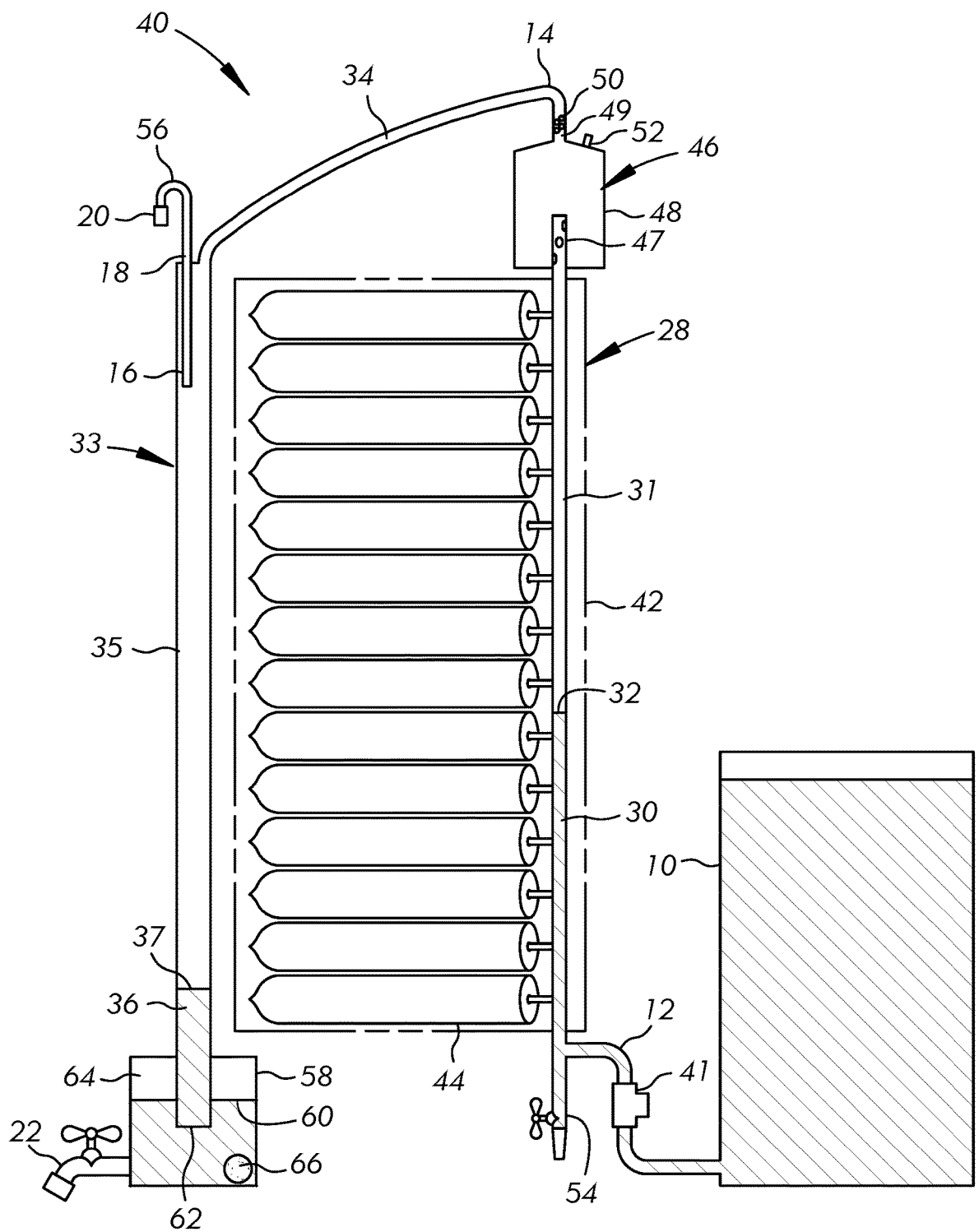

FIG. 4 is a schematic of a second self-regulating vacuum still 40 which produces sterile distillate. The vacuum still 40 has a boiler 28, a vapor separator 46 and a condenser 33. The boiler 28 has a heated enclosure 42 which houses a fluid section 29 and evacuated solar tubes 44. Preferably, the enclosure has a window that allows light through, but as with a greenhouse, traps the heat in the enclosure 42. Note that the enclosure 42 may be provided by an insulated glass enclosure, for example, or it could also be of another type such as a heating chimney connected to a combustion stove, that opens to the atmosphere just below the vapor separator 46. Fourteen evacuated solar tubes 44 are shown, but a different number may be used. Further, the evacuated solar tubes 44 could be substituted for a vertically stacked series of parabolic trough solar collectors, to provide heating for the boiler 28. Impurities, saline slurry, and substances that are not evaporated will accumulate in the drain 54. In the case of desalination, the drain 54 can be partly opened to separate out concentrated saline slurry, for example out a U-shaped pipe outlet onto an evaporating pool for salt production or disposal.

The fluid section 29 of the boiler 28 is preferably an elongate tube which includes a liquid portion 30 and a vapor portion 31, with a liquid level 32 defined at the interface between the liquid portion 30 and the vapor portion 31. As noted above, the volume of the respective liquid portion 30 and the vapor portion 31 will vary along with the liquid level 32 during various evaporative cycles for the vacuum still 40, as noted above in reference to FIG. 1. The evacuated solar tubes 44 are preferably in direct contact with the fluid section 29 for conducting solar heat to the fluid disposed in the fluid section 29. In embodiments where metal piping is used to provide the fluid section 29, the evacuated solar tubes 44 would have direct metal contact with the piping and other structure providing the fluid section 29 for conducting collected solar heat. The fluid section 29 includes a liquid portion 30 and a vapor portion 31. Impure water is added into the water supply reservoir 10 and can flow up through a check valve 41 and the rising water inlet 12 into the fluid section 29 for heating to become a vapor. The water level 32 will settle at some height until it is heated above boiling point for a particular pressure within the fluid section 29, and individual columns of water vapor as steam will push up the fluid section 29 through a porous and capped end segment 47 into an inlet 45 for the vapor separator 46.

The vapor separator 46 has an enclosure 48 which preferably has a larger cross-sectional area than the structure of the vapor portion 31 of the fluid section 29. The larger cross-sectional area allows moisture droplets entrained in the vapor to more readily drop out of the vapor. The enclosure 48 also allows sufficient surface area for water to vaporize properly, without constraint by surface tension effects along pipes and provides enough volume to prevent vacuums from siphoning water up the fluid section 29. The larger cross-sectional area of the enclosure 48 also enables distillation through evaporating up and condensing back down the fluid section 29. The end segment 47 is capped to stop foaming or shooting up, and is porous to be a drain down the fluid section 29 as well as the inlet. The vapor separator 46 has an outlet 49 which passes water vapor from the enclosure 48 to the condenser 33. A packing 50 is disposed in the outlet 49 to remove moisture droplets from the water vapor. The packing 50 is preferably a structured wire mesh. The vapor separator 46 also has an emergency pressure relief valve 52.

Evaporate leaves vapor separator 46 and passes into the condenser 33 where it is cooled in the collection section 34 and the condensate section 35, and then collected as part of the fluid column 36 located in the lower end of the condensate section 35. If air pressure exceeds the vent pressure of the airlock 20, the pressure will release through the outlet 16, the drape pipe 56 to exit the airlock 20 into atmospheric pressure outside. The drape pipe 56 drapes the airlock 20 so that air is released downwards. This has the advantage known to those skilled in sterile technique in biological laboratories, namely that less dust and microbial particulate will have a chance to enter an orifice upwards against gravity. This also has the advantage that no rain water can pool on its outside surface. At the lower end of the condensate section 35 of the condenser 33 is a condensate reservoir 58. This is where clean water is stored. Evaporate condenses and fills until the condensate level 36 surpasses the outlet 16 and pressure builds until boiling ceases and it enters the full phase of the cycle.

The condensate level 60 in the reservoir 58 is depicted in an early stage of filling, where the condensate level 37 is only a short height above the condensate leg drain 62 where it enters the reservoir 58. As the condensate column 36 fills higher and higher in the condensate section 35, the reservoir level 60 will also rise. The pressure will also rise in the ullage 64 of the reservoir 58, which will push and hold the condensate column 36 up. Note that it is possible for the pressure in the ullage 64 to push the fluid level 60 of the reservoir 58 down below the condensate leg drain 62 pipe entrance. This pressurized air in the ullage 64 would release up the condensate column 36 and into the vapor leg inside the condenser 33. Note that it is also possible for pressure in the ullage 64 to entrain all of its air into water dispensed over time through the dispensing valve 22, until there is no longer an air pocket in the ullage 64, but rather only a liquid phase volume of condensate.

Mineral rock 66 is added to the condensate reservoir 58 to make the condensed distillate into drinking water. Preferably the self-regulating still 40 of FIG. 4 as depicted would produce sufficient water for one household's drinking water needs. Note that the condensate reservoir 58 could also be connected at a distance by pipe to the condensate leg drain 62, for example inside a building, to serve as a water-cooler. When drinking water is dispensed through a spigot such as the dispensing valve 22, condensate reservoir 58 has the advantage of being pressurized and self-filling, regardless of the stage or phase of the system cycle. The condensate reservoir 58, and every component of the system that contacts the evaporate and especially the condensate, are preferably comprised of a material with a low solids leach-rate, such as a vitrified ceramic, glass, or low-oxidizing metal, whose interior surfaces may be further sealed with a wax or inert polymer.

The vacuum still of the present disclosure provides advantages of a self-starting and self-regulating vacuum still for producing clean water. The pressure outlet provides the advantage of self-starting, as long as there is a thermal gradient to sustain evaporation in the boiler and condensation in the condenser. Another advantage it provides is the self-filling of the barometric column of condensate in the condensate section. Another advantage is that air entrained in liquid and released under vacuum, which builds up in the condenser, is also vented by the pressure outlet through an airlock or a one-way check valve, which takes out the maintenance requirement of purging the system. If the height of the condensate section were to significantly exceed 10.3 meters, then this system would additionally have the efficiency-improving advantage that the condensate column provides a counter-weight and full vacuum, i.e. constitutes a barometric leg, during most of the filling phase. However, as the system is driven primarily by the temperature gradient, the vacuums formed by gravity and cooling are used to increase the rate of evaporation during the filling phase and thus serve a supporting role in production of condensate. Positive pressure build-up is designed into the system to allow it the advantage of being self-stopping during the full phase.

Although the preferred embodiment has been described in detail, it should be understood that various changes, substitutions and alterations can be made therein without departing from the spirit and scope of the invention as defined by the appended claims.

What is claimed is:

1. A self-regulating vacuum still comprising:
   a fluid reservoir containing a fluid for distillation, said fluid reservoir disposed at a first elevation;
   a boiler having a fluid section which includes a liquid portion and a vapor portion, wherein said liquid portion is in fluid communication with said fluid reservoir for passing said fluid from said fluid reservoir to said fluid section, said fluid is disposed in liquid form within said liquid portion of said fluid section and is heated to generate fluid vapor, and said fluid vapor is disposed in said vapor portion of said fluid section, and an interface between said fluid portion and said vapor portion defines a liquid level;
   a condenser disposed in fluid communication with said fluid section of said boiler for receiving said fluid vapor from said boiler, said condenser including a vapor collection section and a condensate section sequentially disposed in fluid communication for receiving said fluid vapor from said boiler, cooling said fluid vapor to a condensate and receiving said condensate in said condensate section, wherein at least part of said vapor collection section of said condenser is disposed above said liquid level in said fluid section of said boiler, and a condensate level is defined between said fluid vapor and said condensate, and said condensate level is located beneath said vapor collection section;
   an outlet disposed in said condenser, proximate to said collection section and said condensate section, wherein said outlet is disposed in an upper portion of said condensate section at a level which is above said condensate level such that said outlet passes vapor when said condensate section is not filled with condensate, and said level is beneath said condensate level such that said condensate seals vapor from passing from through said outlet when said condensate section is full of condensate; and
   an airlock connected to said outlet for selectively venting fluid vapor from said condenser when a preselected pressure is exceeded within said condenser.

2. The self-regulating vacuum still according to claim 1, further comprising:
   a vapor leg which includes said vapor portion of said fluid section of said boiler and into said collection section of said condenser, extending between said liquid level and said condensate level; and
   a condensate leg disposed in said condensate section and having an upper end defined by said condensate level.

3. The self-regulating vacuum still according to claim 1, further comprising a condensate reservoir disposed in fluid communication with said condensate section of said condenser for receiving condensate from said condensate section, said condensate reservoir having a dispensing valve for selectively passing said condensate therefrom.

4. The self-regulating vacuum still according to claim 1, further comprising a one-way flow control valve disposed between said fluid reservoir and said fluid section of said boiler for passing said fluid from said fluid reservoir to said fluid section and preventing flow of said fluid from said fluid section to said fluid reservoir.

5. The self-regulating vacuum still according to claim 1, further comprising a vapor separator disposed between said fluid section of said boiler and said vapor collection section of said condenser for separating moisture entrained with said fluid vapor from said fluid vapor, said vapor separator having an enclosure which has an enlarged cross-sectional area which is larger than a cross-sectional area of said vapor portion of said fluid section.

6. The self-regulating vacuum still according to claim 5, wherein said vapor separator further includes a vapor outlet extending between said enclosure and said collection section of said condenser, and a structured wire mesh is disposed in said vapor outlet for capturing said moisture entrained in said fluid vapor.

7. The self-regulating vacuum still according to claim 5, wherein said vapor separator further includes a vapor inlet disposed for receiving said fluid vapor from said fluid section of said boiler into said enclosure and having an end segment with perforations for passing said fluid vapor there-through.

8. The self-regulating vacuum still according to claim 1, wherein said air lock comprises a check valve.

9. The self-regulating vacuum still according to claim 1, wherein said boiler further comprises evacuated solar tubes which are thermally connected to said fluid section for collecting solar radiation and passing heat to said fluid section for heating said fluid disposed within said fluid section.

10. A self-regulating vacuum still comprising:
   a fluid reservoir containing a fluid for distillation;
   a boiler having a fluid section which includes a liquid portion and a vapor portion, wherein said liquid portion is in fluid communication with said fluid reservoir for passing said fluid from said fluid reservoir to said fluid section, said fluid is disposed in liquid form within said liquid portion of said fluid section and is heated to generate fluid vapor, and said fluid vapor is disposed in said vapor portion of said fluid section, and an interface between said fluid portion and said vapor portion defines a liquid level;
   a condenser disposed in fluid communication with said fluid section of said boiler for receiving said fluid vapor from said boiler, said condenser including a vapor collection section and a condensate section sequentially disposed in fluid communication for receiving said fluid vapor from said boiler, cooling said fluid vapor to a condensate and receiving said condensate in said condensate section, wherein at least part of said vapor collection section of said condenser is disposed above said liquid level in said fluid section of said boiler, and a condensate level is defined between said fluid vapor and said condensate, and said condensate level defines is located beneath said vapor collection section;
   an outlet disposed in said condenser, proximate to said collection section and said condensate section, wherein said outlet is disposed in an upper portion of said condensate section at a level which is above said condensate level such that said outlet passes vapor when said condensate section is not filled with condensate, and said level is beneath said condensate level such that said condensate seals vapor from passing from through said outlet when said condensate section is full of condensate;

an airlock connected to said outlet for selectively venting fluid vapor from said condenser when a preselected pressure is exceeded within said condenser;

a vapor separator disposed between said fluid section of said boiler and said vapor collection section of said condenser for separating moisture entrained with said fluid vapor from said fluid vapor, said vapor separator having an enclosure which has an enlarged cross-sectional area which is larger than a cross-sectional area of said vapor portion of said fluid section; and a condensate reservoir disposed in fluid communication with said condensate section of said condenser for receiving condensate from said condensate section, said condensate reservoir having a dispensing valve for selectively passing said condensate therefrom.

11. The self-regulating vacuum still according to claim 10, further comprising:

a vapor leg which includes said vapor portion of said fluid section of said boiler and into said collection section of said condenser, extending between said liquid level and said condensate level; and a condensate leg disposed in said condensate section and having an upper end defined by said condensate level.

12. The self-regulating vacuum still according to claim 10, further comprising a one-way flow control valve disposed between said fluid reservoir and said fluid section of said boiler for passing said fluid from said fluid reservoir to said fluid section and preventing flow of said fluid from said fluid section to said fluid reservoir.

13. The self-regulating vacuum still according to claim 10, wherein said vapor separator further includes a vapor outlet extending between said enclosure and said collection section of said condenser, and a structured wire mesh is disposed in said vapor outlet for capturing said moisture entrained in said fluid vapor.

14. The self-regulating vacuum still according to claim 10, wherein said vapor separator further includes a vapor inlet disposed for receiving said fluid vapor from said fluid section of said boiler into said enclosure and having an end segment with perforations for passing said fluid vapor there-through.

15. The self-regulating vacuum still according to claim 10, wherein said air lock comprises a check valve.

16. The self-regulating vacuum still according to claim 10, wherein said boiler further comprises evacuated solar tubes which are thermally connected to said fluid section for collecting solar radiation and passing heat to said fluid section for heating said fluid disposed within said fluid section.

17. A self-regulating vacuum still comprising:

a fluid reservoir containing a fluid for distillation;

a boiler having a fluid section which includes a liquid portion and a vapor portion, wherein said liquid portion is in fluid communication with said fluid reservoir for passing said fluid from said fluid reservoir to said fluid section, said fluid is disposed in liquid form within said liquid portion of said fluid section and is heated to generate fluid vapor, and said fluid vapor is disposed in said vapor portion of said fluid section, and an interface between said fluid portion and said vapor portion defines a liquid level;

a condenser disposed in fluid communication with said fluid section of said boiler for receiving said fluid vapor from said boiler, said condenser including a vapor collection section and a condensate section sequentially disposed in fluid communication for receiving said fluid vapor from said boiler, cooling said fluid vapor to a condensate and receiving said condensate in said condensate section, wherein at least part of said vapor collection section of said condenser is disposed above said liquid level in said fluid section of said boiler, and a condensate level is defined between said fluid vapor and said condensate, and said condensate level defines is located beneath said vapor collection section;

an outlet disposed in said condenser, proximate to said collection section and said condensate section, wherein said outlet is disposed in an upper portion of said condensate section at a level which is above said condensate level such that said outlet passes vapor when said condensate section is not filled with condensate, and said level is beneath said condensate level such that said condensate seals vapor from passing from through said outlet when said condensate section is full of condensate;

an airlock connected to said outlet for selectively venting fluid vapor from said condenser when a preselected pressure is exceeded within said condenser;

a vapor separator disposed between said fluid section of said boiler and said vapor collection section of said condenser for separating moisture entrained with said fluid vapor from said fluid vapor, said vapor separator having an enclosure which has an enlarged cross-sectional area which is larger than a cross-sectional area of said vapor portion of said fluid section;

said vapor separator further including a vapor outlet extending between said enclosure and said collection section of said condenser, and a structured wire mesh is disposed in said vapor outlet for capturing said moisture entrained in said fluid vapor; and said vapor separator further including a vapor inlet disposed for receiving said fluid vapor from said fluid section of said boiler into said enclosure and having an end segment with perforations for passing said fluid vapor there-through.

18. The self-regulating vacuum still according to claim 17, further comprising a condensate reservoir disposed in fluid communication with said condensate section of said condenser for receiving condensate from said condensate section, said condensate reservoir having a dispensing valve for selectively passing said condensate therefrom.

19. The self-regulating vacuum still according to claim 17, further comprising a one-way flow control valve disposed between said fluid reservoir and said fluid section of said boiler for passing said fluid from said fluid reservoir to said fluid section and preventing flow of said fluid from said fluid section to said fluid reservoir.

20. The self-regulating vacuum still according to claim 17, wherein said boiler further comprises evacuated solar tubes which are thermally connected to said fluid section for collecting solar radiation and passing heat to said fluid section for heating said fluid disposed within said fluid section.

* * * * *